(12) United States Patent
Fu et al.

(10) Patent No.: US 9,366,521 B2
(45) Date of Patent: Jun. 14, 2016

(54) APPARATUS AND METHOD FOR MEASURING THE EROSION DEPTH OF A SPUTTERING TARGET

(71) Applicant: SHENZHEN CHINA STAR OPTOELECTRONICS TECHNOLOGY CO., LTD., Shenzhen, Guangdong (KR)

(72) Inventors: Pinzheng Fu, Guangdong (CN); Chao-Mu Chen, Guangdong (CN)

( * ) Notice: Subject to any disclaimer, the term of this patent is extended or adjusted under 35 U.S.C. 154(b) by 0 days.

(21) Appl. No.: 14/111,801

(22) PCT Filed: Jul. 19, 2013

(86) PCT No.: PCT/CN2013/079657
§ 371 (c)(1),
(2) Date: Oct. 15, 2013

(87) PCT Pub. No.: WO2014/201747
PCT Pub. Date: Dec. 24, 2014

(65) Prior Publication Data
US 2016/0138902 A1      May 19, 2016

(30) Foreign Application Priority Data
Jun. 21, 2013  (CN) .......................... 2013 1 0250728

(51) Int. Cl.
*G01B 5/18*       (2006.01)

(52) U.S. Cl.
CPC ....................... *G01B 5/18* (2013.01)

(58) Field of Classification Search
CPC ......................................... G01B 5/18
USPC ........................... 33/572, 832, 833, 834, 836
See application file for complete search history.

(56) References Cited

U.S. PATENT DOCUMENTS

| 1,765,624 | A | * | 6/1930 | Scusa | G01B 3/00 33/642 |
| 2007/0227027 | A1 | * | 10/2007 | Holzapfel | G01D 5/34707 33/706 |
| 2012/0324750 | A1 | * | 12/2012 | Kawada | G01D 5/34707 33/706 |
| 2013/0125409 | A1 | * | 5/2013 | Conigliaro | G01B 5/20 33/836 |
| 2014/0230263 | A1 | * | 8/2014 | Livitski | G01B 5/0037 33/701 |

* cited by examiner

*Primary Examiner* — G. Bradley Bennett (57) ABSTRACT

The present invention discloses an apparatus and a method for measuring the erosion depth of a sputtering target, the apparatus for measuring the erosion depth of a sputtering target comprises a guiding rail, a positioning component and an erosion depth measuring device, the erosion depth measuring device is provided at the guiding rail in a relatively movable manner, the positioning component is disposed at the two sides of the guiding rail so as to support the guiding rail. According to the present invention, the erosion depth data can be known timely, and the utilization ratio of the sputtering target can be improved.

16 Claims, 6 Drawing Sheets

APPARATUS AND METHOD FOR MEASURING THE EROSION DEPTH OF A SPUTTERING TARGET

FIELD OF THE INVENTION

The present invention pertains to the filed of PVD (physical vapour deposition) technology, and in particular relates to an apparatus for measuring the erosion depth of a sputtering target.

BACKGROUND OF THE INVENTION

The statements in this section merely provide background information related to the present invention and may or may not constitute prior art.

In the manufacturing photolithography of thin film transistor and LCD (liquid crystal display) modules, magnetron sputtering is often used in PVD devices for improving sputtering efficiency. Magnets disposed below the sputtering target can improve utilization rate of the sputtering target. However, as a result of the movement of the magnets, the sputtering target may be etched unexpectedly in the form of an etching curve. When the erosion depth of a sputtering target reaches a certain value, the sputtering target can not be used any more.

It is desirable to measure the erosion depth of the sputtering target being used, and adjust the movement of the magnets and the distribution of the magnetic filed, so as to form a uniform etching curve and improve the utilization rate of the sputtering target.

SUMMARY OF THE INVENTION

The present invention provides an apparatus for measuring the erosion depth of a sputtering target to solve the mentioned problem above.

The present invention is realized in such a way that: an apparatus for measuring the erosion depth of a sputtering target, comprising a guiding rail, a positioning component and an erosion depth measuring device, the erosion depth measuring device is provided at the guiding rail in a relatively movable manner, the positioning component is disposed at the two sides of the guiding rail so as to support the guiding rail.

According to an embodiment disclosed herein, the erosion depth measuring device comprises a depth gauge for measuring the erosion depth of the sputtering target.

According to another embodiment disclosed herein, the positioning component comprises a magnetic component.

According to another embodiment disclosed herein, the magnetic component comprises a magnet or an electromagnet.

According to another embodiment disclosed herein, the apparatus for measuring the erosion depth of a sputtering target further comprises a connecting component, the connecting component is configured to connect the positioning component and the guiding rail and connect the erosion depth measuring device and the guiding rail.

According to another embodiment disclosed herein, the guiding rail is provided with a sliding groove extending along the longitudinal direction of the guiding rail at the bottom side of the guiding rail.

According to another embodiment disclosed herein, the sliding groove comprises a receiving portion and a holding portion, the connecting component is provided with a flange engaging with the receiving portion at the upper side of the connecting component, the holding portion is located below the receiving portion and is configured to hold the flange.

According to another embodiment disclosed herein, the connecting component is provided with an elastic member, the sliding groove includes a plurality of positioning holes arranged in equal space along the longitudinal direction of the guiding rail, and the elastic member is configured to engage with the plurality of positioning holes.

According to another embodiment disclosed herein, the elastic member is a spring pin.

According to another embodiment disclosed herein, the apparatus for measuring the erosion depth of a sputtering target further comprises a connecting component, the connecting component is configured to connect the positioning component and the guiding rail and connect the erosion depth measuring device and the guiding rail, the guiding rail is provided with a sliding groove extending along the longitudinal direction of the guiding rail at the bottom side of the guiding rail, the sliding groove comprises a receiving portion and a holding portion, the connecting component is provided with a flange engaging with the receiving portion at the upper side of the connecting component, the holding portion is located below the receiving portion and is configured to hold the flange.

According to another aspect of the present invention, a method for measuring the erosion depth of a sputtering target is provided, which comprises a positioning step for positioning an erosion depth measuring device above a sputtering target by means of a positioning component and a measuring step for moving the erosion depth measuring device along the longitudinal direction of a guiding rail so as to measure the erosion depth of the sputtering target.

According to an embodiment disclosed herein, the erosion depth measuring device comprises a depth gauge for measuring the erosion depth of the sputtering target.

According to another embodiment disclosed herein, the positioning component comprises a magnetic component.

According to another embodiment disclosed herein, the magnetic component comprises a magnet or an electromagnet.

According to another embodiment disclosed herein, between the positioning component and the guiding rail there is provided with a connecting component, the connecting component is configured to connect the positioning component and the guiding rail, between the erosion depth measuring device and the guiding rail there is also provided with a connecting component, the connecting component is configured to connect the erosion depth measuring device and the guiding rail.

According to another embodiment disclosed herein, the guiding rail is provided with a sliding groove extending along the longitudinal direction of the guiding rail at the bottom side of the guiding rail, the sliding groove comprises a receiving portion and a holding portion, the connecting component is provided with a flange engaging with the receiving portion at the upper side of the connecting component, the holding portion is located below the receiving portion and is configured to hold the flange.

According to the present invention, the apparatus for measuring the erosion depth of a sputtering target comprises a guiding rail, a positioning component and an erosion depth measuring device, the erosion depth measuring device is provided at the guiding rail in a relatively movable manner, the positioning component is disposed at the two sides of the guiding rail so as to support the guiding rail. In this way, the utilization ratio of the sputtering target can be improved and thus the productivity can be improved.

For more clearly and easily understanding above content of the present invention, the following text will take a preferred embodiment of the present invention with reference to the accompanying drawings for detail description as follows.

BRIEF DESCRIPTION OF THE DRAWINGS

The drawings described herein are for illustration purposes only and are not intended to limit the scope of the present disclosure in any way.

DETAILED DESCRIPTION OF PREFERRED EMBODIMENTS

The following detailed description of every embodiment with reference to the accompanying drawings is used to exemplify a specific embodiment, which may be carried out in the present invention. Directional terms mentioned in the present invention, such as "top", "bottom", "front", "rear", "left", "right", "side" etc., are only used with reference to the orientation of the accompanying drawings. Therefore, the used directional terms are intended to illustrate, but not to limit, the present invention. Also the following description is merely exemplary in nature and is not intended to limit the present disclosure, application, or uses.

The terms "a" or "an", as used herein, are defined as one or more than one, unless expressly specified otherwise. The term plurality, as used herein, is defined as two or more than two. The term another, as used herein, is defined as at least a second or more. The terms including and/or having, as used herein, are defined as comprising (i.e., open language).

Figure 1:
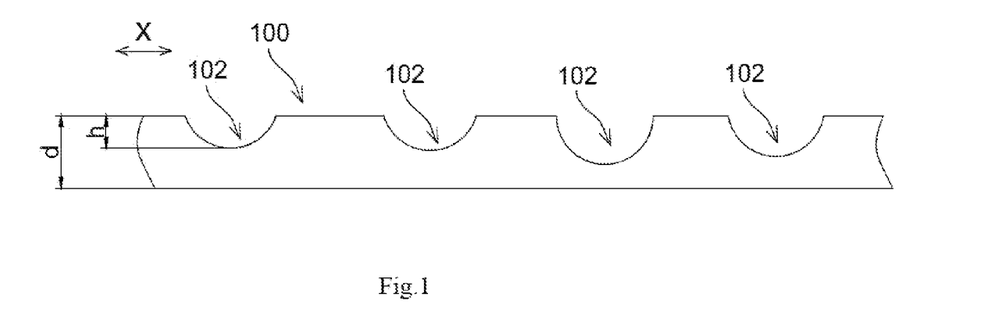
FIG. 1 is a schematic view for showing the etching curve and the erosion depth of a sputtering target.

Referring to FIG. 1, the erosion depth h of the sputtering target 100 at etching positions 102 may vary under certain circumstances. In other words, the erosion depth h of the sputtering target 100 depends on the movement of the magnets, airflow in the PVD equipments and so on. Moreover, the erosion depth h of the sputtering target 100 varies according to the manufacturer of the PVD equipments and the manufacture date of the PVD equipments. Once the erosion depth h of the sputtering target 100 reaches the thickness d of the sputtering target 100, the sputtering target 100 can not be utilized by the PVD equipments and must be sent to the original supplier of the sputtering target for replacement. Therefore, it is desirable to provide an apparatus for measuring the erosion depth of a sputtering target, which can measure the erosion depth of the sputtering target in the maintenance period of the PVD equipments, such that the erosion depth data can be known immediately, timely and accurately. Based on the erosion depth data, the movement of the magnet can be adjusted and the erosion depth of the sputtering target can be adjusted uniformly. In this way, the utilization ratio of the sputtering target can be improved and thus the productivity can be improved.

In view of this, the inventor of the present invention provides the apparatus for measuring the erosion depth of a sputtering target. The apparatus for measuring the erosion depth of a sputtering target comprises a guiding rail 400, a positioning component 600 and an erosion depth measuring device 500. The erosion depth measuring device 500 is provided at the guiding rail 400 in a relatively movable manner. In other words, the erosion depth measuring device 500 is connected with the guiding rail 400 and is movable relative to the guiding rail 400. Furthermore, as shown in FIG. 1, the positioning component 600 is disposed at the two sides of the guiding rail 400 so as to support the guiding rail 400. The positioning component 600 comprises two position legs. The positioning component 600 can be considered as the moving legs of the guiding rail 400.

In this way, the erosion depth measuring device 500 can be positioned above the sputtering target 100 by means of a positioning component 600, and the erosion depth measuring device 500 can moves along the longitudinal direction X of the guiding rail 400 so as to measure the erosion depth h of the sputtering target 100 at different positions. The erosion depth data can be measured timely and accurately. Based on the erosion depth data, the movement of the magnet can be adjusted and the erosion depth of the sputtering target can be adjusted uniformly. In this way, the utilization ratio of the sputtering target can be improved and thus the productivity can be improved. When the erosion depths h of the sputtering target 100 at different positions become same substantially, the utilization ratio of the sputtering target can be improved. When the life time of the sputtering target extends, the total cost of sputtering targets can be saved. Also, when the erosion depths h of the sputtering target 100 at different positions are same substantially, defects of end products will decrease, the production stability will be improved.

In this embodiment, the erosion depth measuring device 500 comprises a depth gauge (also referred as a height gauge) for measuring the erosion depth h of the sputtering target 100. The depth gauge may be a digital depth gauge which is available in markets.

In this embodiment, the positioning component 600 comprises a magnetic component 200. The magnetic component 200 may comprise a magnet or an electromagnet. By means of the magnetic component 200, the positioning component 600 can be attached on a fixed structure 300 (made of steel). The fixed structure 300 may be the chamber door of the PVD equipment.

Figure 2:
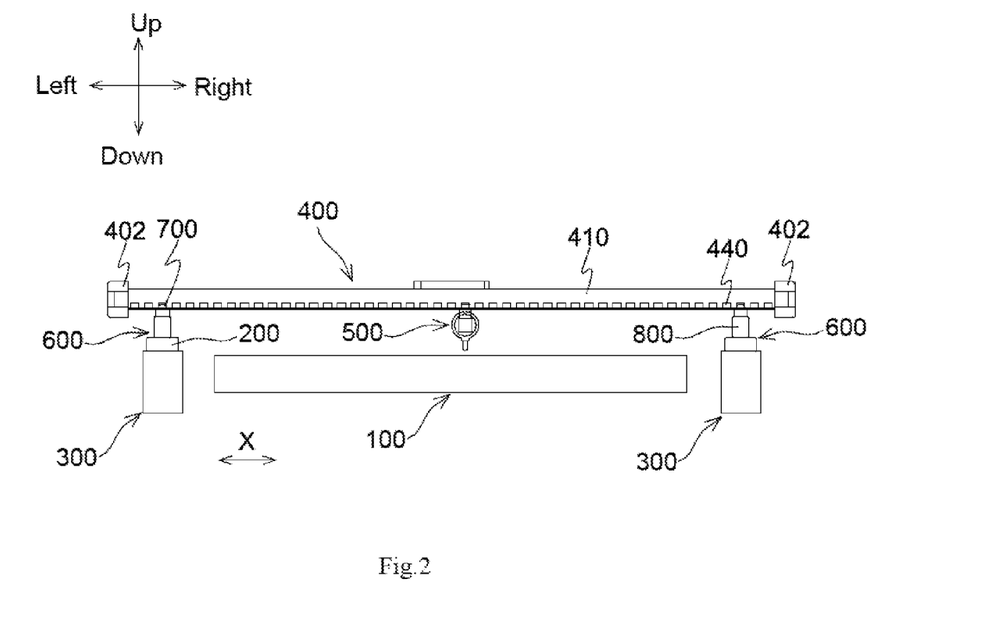
FIG. 2 is a schematic front view of the apparatus for measuring the erosion depth of a sputtering target according to an embodiment of the present invention.
Figure 3:
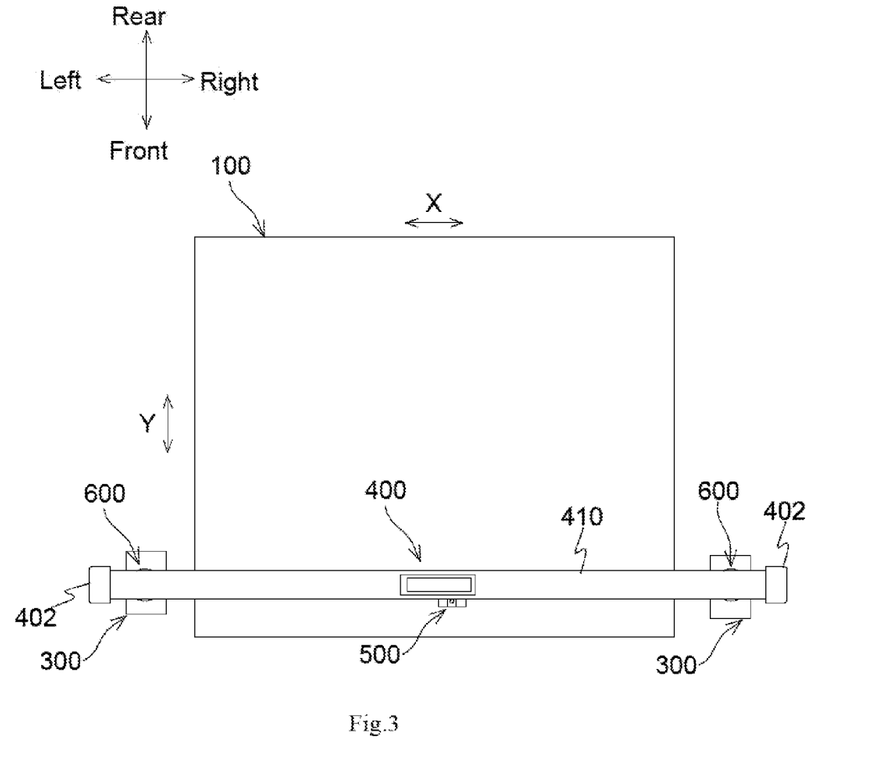
FIG. 3 is a schematic top view of the apparatus for measuring the erosion depth of a sputtering target in FIG. 2.

As shown in FIG. 2, between the positioning component 600 and the guiding rail 400 there is provided with a connecting component 700, the connecting component 700 is configured to connect the positioning component 600 and the guiding rail 400. Also between the erosion depth measuring device 500 and the guiding rail 400 there is also provided with a connecting component 700, the connecting component 700 is configured to connect the erosion depth measuring device 500 and the guiding rail 400. In other words, there are three connecting components 700, two connecting components 700 are engaged with the two legs of the positioning component 600, one connecting component 700 is engaged with the erosion depth measuring device 500. By means of the connecting components 700, the positioning component 600 and the erosion depth measuring device 500 can be connected to the guiding rail 400, and move along the longitudinal direction X of the guiding rail 400 at the bottom side of the guiding rail 400 with respect to the guiding rail 400.

Figure 4:
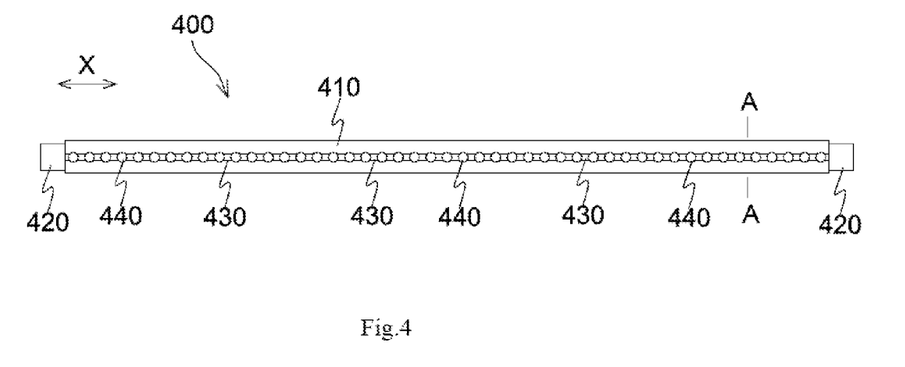
FIG. 4 is a schematic bottom view of the guiding rail of the apparatus for measuring the erosion depth of a sputtering target in FIG. 2.
Figure 5:
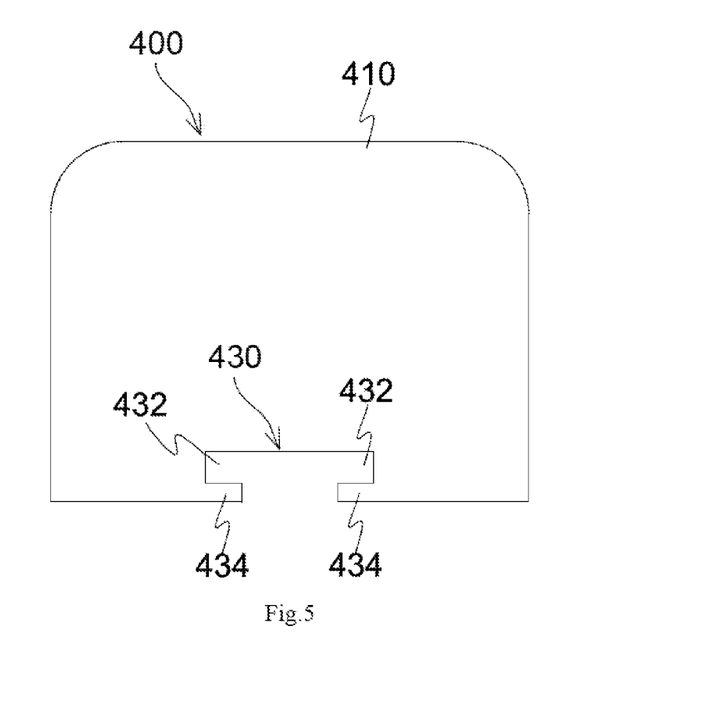
FIG. 5 is a schematic cross sectional view of the guiding rail along line A-A in FIG. 4.
Figure 6:
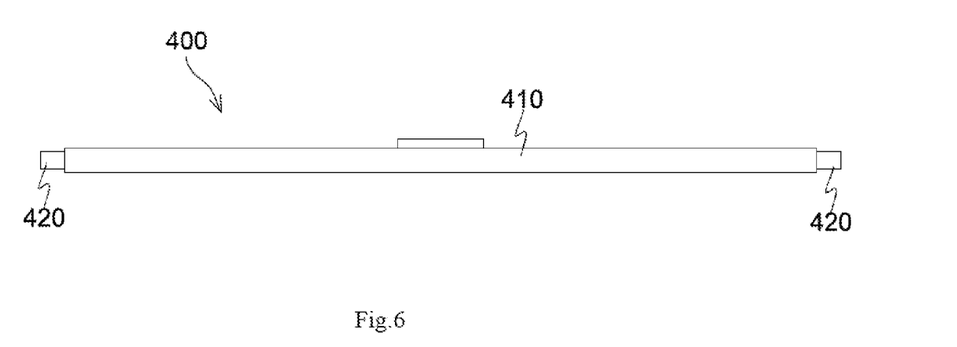
FIG. 6 is a schematic front view of the guiding rail.

As shown in FIG. 1, FIG. 4 and FIG. 5, the guiding rail 400 comprises a principal body 410, two end covers 402, a sliding groove 430 and a plurality of positioning holes 440. The sliding groove 430 extends along the longitudinal direction X of the guiding rail 400 at the bottom side of the guiding rail 400. The sliding groove 430 is formed on the principal body 410. The two end covers 402 cover on the two sides 420 of the principal body 410. The sliding groove 430 comprises a receiving portion 432 and a holding portion 434, as shown in FIG. 5, which will be described below.

Figure 7:
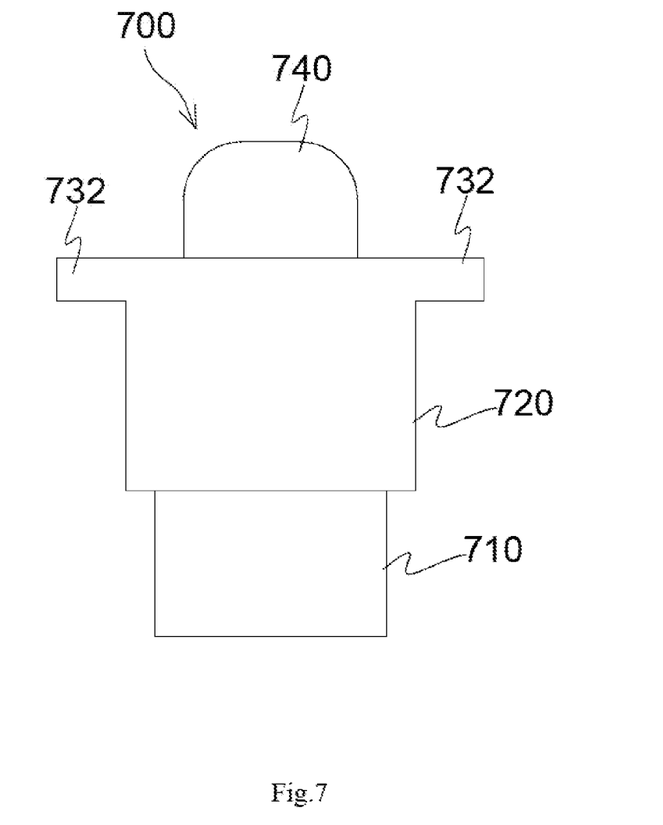
FIG. 7 is a schematic side view of the connecting component of the apparatus for measuring the erosion depth of a sputtering target in FIG. 2.

As shown in FIG. 7, the connecting component 700 comprises a basic body 720, a flange 732, an elastic member 740 and a connection portion 710. The flange 732 engages with the receiving portion 432 and is provided at the upper side of the connecting component 700. The holding portion 434 is located below the receiving portion 432 and is configured to hold the flange 732, as shown in FIG. 5. The elastic member 740 is received in the basic body 720. The connection portion 710 is used to connect directly with the erosion depth measuring device 500. The connection portion 710 is also used to connect directly with the positioning component 600. For example, the connection portion 710 may be a threaded portion. In this way, the erosion depth measuring device 500 is movably connected with the guiding rail 400, and the erosion depth measuring device 500 will not fall and separate from the guiding rail 400 unexpectedly. Likewise, the positioning component 600 is movably connected with the guiding rail 400, and the positioning component 600 will not fall and separate from the guiding rail 400 unexpectedly.

It should be noted that, the elastic member 740 is configured to engage with the plurality of positioning holes 440. The elastic member 740 is a spring pin which tends to extend into one positioning hole 440 by a compression spring. The plurality of positioning holes 440 are preferably arranged in equal space along the longitudinal direction X of the guiding rail 400. By means of the engagement of the elastic member 740 and one selected positioning hole 440, the positioning of the erosion depth measuring device 500 and the positioning component 600 can be achieved easily at different positions. On the other hand, by pressing the button (not shown) of the elastic member 740, the elastic member 740 will exit from the positioning hole 440, and the erosion depth measuring device 500 and the positioning component 600 can move along the longitudinal direction X of the guiding rail 400 from one position to another position as desired.

Figure 8:
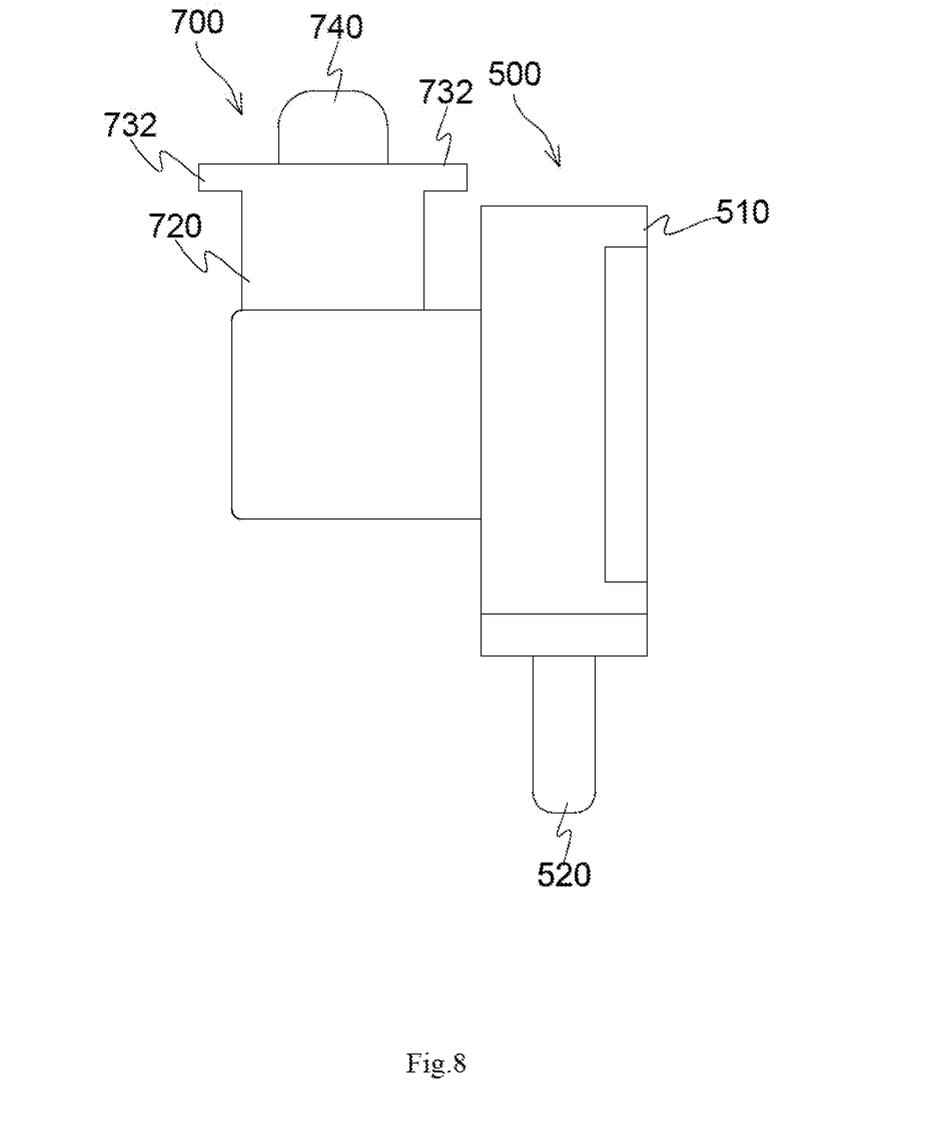
FIG. 8 is a schematic side view of the depth gauge of the apparatus for measuring the erosion depth of a sputtering target in FIG. 2.

As shown in FIG. 8, the erosion depth measuring device 500 comprises a main body 510 and a probe pin 520. The connection portion 710 of the connecting component 700 is connected with the main body 510. The probe pin 520 will contact with the surface of the sputtering target 100 to obtain the erosion depth data in measuring.

Figure 9:
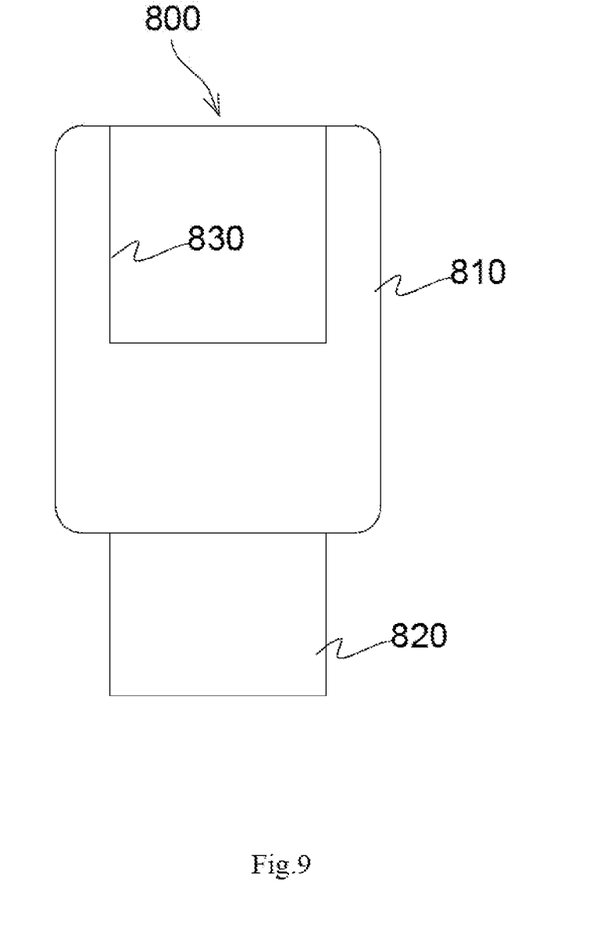
FIG. 9 is a schematic side view of the support bar of the apparatus for measuring the erosion depth of a sputtering target in FIG. 2.

As described above, the positioning component 600 comprises a magnetic component 200. The magnetic component 200 is connected with the connecting component 700 by a support bar 800 as shown in FIG. 2. The support bar 800 comprises a main part 810, a connecting rod 820 and a connecting recess 830, as shown in FIG. 9. The connecting recess 830 is connected with the connection portion 710 of the connecting component 700. The connecting rod 820 is connected with the magnetic component 200. In another embodiment, the connecting rod 820 is extensible relative to the main part 810, such that the distance between the guiding rail and the sputtering target in up-down direction can be adjusted.

According to another aspect of the present invention, a method for measuring the erosion depth of a sputtering target is provided. The method for measuring the erosion depth of a sputtering target is achieved by the apparatus for measuring the erosion depth of a sputtering target described above.

Figure 10:
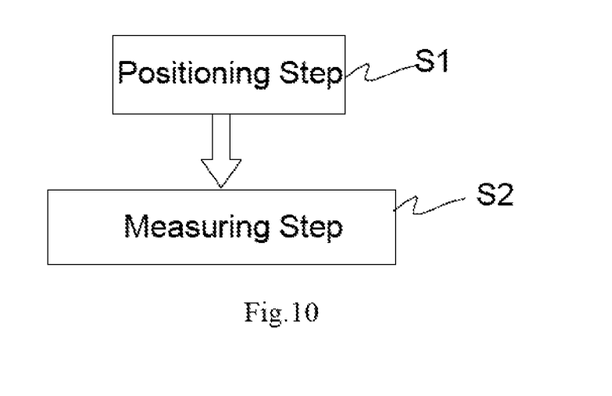
FIG. 10 is a schematic flow diagram of the method for measuring the erosion depth of a sputtering target according to an embodiment of the present invention.

As shown in FIG. 10, the method for measuring the erosion depth of a sputtering target comprises a positioning step S1 and a measuring step S2. In the positioning step S1, the erosion depth measuring device 500 is positioned above the sputtering target 100 by means of the positioning component 600. In the measuring step S2, the erosion depth measuring device 500 is moved along the longitudinal direction X of the guiding rail so as to measure the erosion depth h of the sputtering target 100 at different positions. It is obvious that the erosion depth measuring device 500 can also be moved along the lateral direction Y of the sputtering target.

According to the present invention, the erosion depth of the sputtering target at different positions can be measured as desired in the maintenance period of the PVD equipments, such that the erosion depth data can be known timely and accurately. Based on the erosion depth data, the movement of the magnet can be adjusted and the erosion depth of the sputtering target can be adjusted uniformly. In this way, the utilization ratio of the sputtering target can be improved and thus the productivity can be improved. For example, the sputtering target ITO (Indium Tin Oxides) is very expensive. The cost of materials can be saved. There is no need to send sputtering targets back to original supplier of the sputtering target for replacement or maintenance.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An apparatus for measuring the erosion depth of a sputtering target, comprising a guiding rail, a positioning component and an erosion depth measuring device, wherein the erosion depth measuring device is provided at the guiding rail in a relatively movable manner, the positioning component is disposed at the two sides of the guiding rail so as to support the guiding rail.

2. The apparatus for measuring the erosion depth of a sputtering target of claim 1, wherein the erosion depth measuring device comprises a depth gauge for measuring the erosion depth of the sputtering target.

3. The apparatus for measuring the erosion depth of a sputtering target of claim 1, wherein the positioning component comprises a magnetic component.

4. The apparatus for measuring the erosion depth of a sputtering target of claim 3, wherein the magnetic component comprises a magnet or an electromagnet.

5. The apparatus for measuring the erosion depth of a sputtering target of claim 1, wherein the apparatus for measuring the erosion depth of a sputtering target further comprises a connecting component, the connecting component is configured to connect the positioning component and the guiding rail and connect the erosion depth measuring device and the guiding rail.

6. The apparatus for measuring the erosion depth of a sputtering target of claim 5, wherein the guiding rail is provided with a sliding groove extending along the longitudinal direction of the guiding rail at the bottom side of the guiding rail.

7. The apparatus for measuring the erosion depth of a sputtering target of claim 6, wherein the sliding groove comprises a receiving portion and a holding portion, the connecting component is provided with a flange engaging with the receiving portion at the upper side of the connecting component, the holding portion is located below the receiving portion and is configured to hold the flange.

8. The apparatus for measuring the erosion depth of a sputtering target of claim 7, wherein the connecting component is provided with an elastic member, the sliding groove includes a plurality of positioning holes arranged in equal space along the longitudinal direction of the guiding rail, and the elastic member is configured to engage with the plurality of positioning holes.

9. The apparatus for measuring the erosion depth of a sputtering target of claim 8; wherein the elastic member is a spring pin.

10. The apparatus for measuring the erosion depth of a sputtering target of claim 1, wherein the apparatus for measuring the erosion depth of a sputtering target further comprises a connecting component, the connecting component is configured to connect the positioning component and the guiding rail and connect the erosion depth measuring device and the guiding rail, the guiding rail is provided with a sliding groove extending along the longitudinal direction of the guiding rail at the bottom side of the guiding rail, the sliding groove comprises a receiving portion and a holding portion, the connecting component is provided with a flange engaging with the receiving portion at the upper side of the connecting component, the holding portion is located below the receiving portion and is configured to hold the flange.

11. A method for measuring the erosion depth of a sputtering target, comprising a positioning step for positioning an erosion depth measuring device above a sputtering target by means of a positioning component and a measuring step for moving the erosion depth measuring device along the longitudinal direction of a guiding rail so as to measure the erosion depth of the sputtering target.

12. The method for measuring the erosion depth of a sputtering target of claim 11, wherein the erosion depth measuring device comprises a depth gauge for measuring the erosion depth of the sputtering target.

13. The method for measuring the erosion depth of a sputtering target of claim 11, wherein the positioning component comprises a magnetic component.

14. The method for measuring the erosion depth of a sputtering target of claim 13, wherein the magnetic component comprises a magnet or an electromagnet.

15. The method for measuring the erosion depth of a sputtering target of claim 11, wherein between the positioning component and the guiding rail there is provided with a connecting component, the connecting component is configured to connect the positioning component and the guiding rail, between the erosion depth measuring device and the guiding rail there is also provided with a connecting component, the connecting component is configured to connect the erosion depth measuring device and the guiding rail.

16. The method for measuring the erosion depth of a sputtering target of claim 15, wherein the guiding rail is provided with a sliding groove extending along the longitudinal direction of the guiding rail at the bottom side of the guiding rail, the sliding groove comprises a receiving portion and a holding portion, the connecting component is provided with a flange engaging with the receiving portion at the upper side of the connecting component, the holding portion is located below the receiving portion and is configured to hold the flange.

* * * * *